United States Patent [19]

Sakano et al.

[11] 4,228,051

[45] Oct. 14, 1980

[54] THERMOPLASTIC RESIN COMPOSITION HAVING GOOD HEAT CYCLE PROPERTY

[75] Inventors: Hajime Sakano, Osaka; Mikio Kodama, Nagisasakae; Toshihiro Shoji; Isao Yoshida, both of Amagasaki, all of Japan

[73] Assignee: Sumitomo Naugatuck Co., Ltd., Japan

[21] Appl. No.: 62,584

[22] Filed: Jul. 31, 1979

[51] Int. Cl.$^2$ .................. C08L 83/04; C08L 91/00
[52] U.S. Cl. .................. 260/23.7 R; 260/29.1 SB; 260/31.2 R; 260/32.6 A; 260/33.4 R; 260/33.6 A; 260/33.6 SB; 428/462; 525/63; 525/64; 525/70; 525/72; 525/86
[58] Field of Search .................. 260/23.7 R, 29.1 SB, 260/31.2 R, 32.6 A, 33.4 R, 33.6 A, 33.6 SB; 525/63, 64, 70, 72, 86

[56] References Cited

U.S. PATENT DOCUMENTS

| | | | |
|---|---|---|---|
| 2,948,703 | 8/1960 | Schroeder | 525/315 |
| 3,919,157 | 11/1975 | Ide et al. | 260/29.1 SB |
| 4,086,201 | 4/1978 | Peters et al. | 260/29.1 SB |

*Primary Examiner*—J. Ziegler
*Attorney, Agent, or Firm*—Jones, Tullar & Cooper

[57] ABSTRACT

A thermoplastic resin composition having a good heat cycle property which comprises (A) a graft polymer comprising a conjugated diene rubber and an aromatic vinyl compound and a vinylic cyanide grafted thereon in a weight proportion of 5–80:15–140, the weight ratio of the aromatic vinyl compound and the vinylic cyanide being 10–90:5–50, (B) a copolymer comprising an aromatic vinyl compound and a vinylic cyanide in a weight ratio of 40:60 to 90:10 and (C) an organo-silicon compound, the weight proportion of the graft polymer (A) and the copolymer (B) being from 5:95 to 95:5 and the amount of the organo-silicon compound (C) being from 0.05 to 3.0 parts by weight to 100 parts by weight of the combined amount of graft polymer (A) and the copolymer (B).

6 Claims, No Drawings

THERMOPLASTIC RESIN COMPOSITION HAVING GOOD HEAT CYCLE PROPERTY

The present invention relates to a thermoplastic resin composition having an excellent heat cycle property. More particularly, it relates to a thermoplastic resin composition, and its molded product and plated molded product, excellent in heat cycle property.

In metal-plated plastic products, undesirable "blistering" is frequently observed between the surface of the plastic substrate and the metallic film plated thereon. This is because the difference between the plastic substrate and the metallic film in coefficient of linear expansion is so great that they are forced to separate each other due to the change of environmental conditions, particularly the change of temperature. The characteristics of plastics, plastic products or plated plastic products relating to such blistering is called "heat cycle property".

In recent years, the demand for plated plastic products is rapidly increasing due to their inexpensiveness and lightweight. On the other hand, plated plastic products tend to become larger in size and more complicated in shape. In addition, there is a tendency that plated plastic products are used under severe conditions. Therefore, the appearance of a plated plastic product having an excellent heat cycle property as well as a good processability and a good mold release characteristics has been highly demanded.

Hitherto, ABS resin (acrylonitrile-butadiene-styrene terpolymer) has been widely used as a thermoplastic resin suitable for metal plating. However, its heat cycle property is not sufficiently high. In order to improve a heat cycle property, it has been proposed to make a plated metallic film thicker, for instance, 40 to 50μ in case of copper, 10 to 20μ in case of nickel and 0.1 to 0.3μ in case of chromium. This is apparently not economical. In addition, its effect is insufficient.

As the result of an extensive study, it has now been found that a blend of a certain specific graft polymer, a certain specific copolymer and a certain specific organosilicon compound can afford a molded product suitable for metal plating, and the plated product resulting therefrom shows an excellent heat cycle property. It has also been found that when the blend is incorporated with a lubricant, the processability and the mold release characteristics are much improved. Besides, it may be noted that the blend has as such excellent physical properties as seen in ABS resin and shows good impact resistance, heat resistance, chemical resistance, etc.

The thermoplastic resin composition of the present invention comprises (A) a graft polymer comprising a conjugated diene rubber and an aromatic vinyl compound and a vinylic cyanide grafted thereon in a weight proportion of 5–80:15–140, the weight ratio of the aromatic vinyl compound and the vinylic cyanide being 10–90:5–50, (B) a copolymer comprising an aromatic vinyl compound and a vinylic cyanide in a weight ratio of 40:60 to 90:10 and (C) an organo-silicon compound, the weight proportion of the graft polymer (A) and the copolymer (B) being from 5:95 to 95:5 and the amount of the organo-silicon compound (C) being from 0.05 to 3.0 parts by weight to 100 parts by weight of the combined amount of the graft polymer (A) and the copolymer (B).

The resin composition shows an excellent heat cycle property. When a lubricant is incorporated in such resin composition in a proportion of 0.05 to 3 parts by weight to 100 parts by weight of the combined amount of the graft polymer (A) and the copolymer (B), the processability and the mold release characteristics are significantly enhanced.

In the resin composition of the invention, the amount of the conjugated diene rubber in the graft polymer (A) is preferred to be from 5 to 60% by weight based on the total amount of the resin composition.

The graft polymer (A) is obtainable at grafting 10 to 90 parts by weight of an aromatic vinyl compound and 5 to 50 parts by weight of a vinylic cyanide onto 5 to 80 parts by weight of a conjugated diene rubber in a per se conventional polymerization procedure such as emulsion polymerization, suspension polymerization, emulsion-suspension polymerization, bulk polymerization, bulk-suspension polymerization or solution polymerization. Among various polymerization procedures, the adoption of emulsion polymerization, suspension polymerization or emulsion-suspension polymerization is favorable with respect to the enhancement of the heat cycle property. When the amount relationship between the conjugated diene rubber and each or both of the monomers to be grafted thereon is not within the said range, not only the heat cycle property but also other physical and chemical properties are inferior.

The copolymer (B) comprises an aromatic vinyl compound and a vinylic cyanide in a weight proportion of 40:60 to 90:10 and is obtainable by copolymerization of the said two monomers in a per se conventional polymerization procedure. When the weight proportion of the monomers is not within the said range, not only the heat cycle property but also other physical and chemical properties are inferior.

Preferably, the inherent viscosity of the copolymer (B) is to be from 0.4 to 0.8 (determined in dimethylformamide at 30° C.). When the inherent viscosity is higher, processability is deteriorated. Further, dispersibility of the organo-silicon compound (C) becomes inferior so that a product of even quality having a good heat cycle property is hardly obtainable. When the intrinsic viscosity is lower, resistance to etching becomes poor and overetching occurs frequently so that a product of good quality is hardly obtainable.

Examples of the conjugated diene rubber which constitutes the graft polymer (A) are polybutadiene, styrene-butadiene copolymer, acrylonitrile-butadiene copolymer, etc. Examples of the aromatic vinyl compound to be used for preparation of the graft polymer (A) and the copolymer (B) are styrene, α-methylstyrene, vinyltoluene, halogenated styrene, etc. As the vinylic cyanide as the constituent of the graft polymer (A) and the copolymer (B), there may be used, for instance, acrylonitrile or methacrylonitrile.

As the organo-silicon compound (C), there may be used polysiloxanes of the formula:

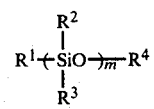

wherein $R^1$ to $R^4$ are each lower alkyl or aryl and m is a number of 1 to 2000, silanes of the formula: $R^1R^2R^3R^4Si$ wherein $R^1$ to $R^4$ are each as defined above, halosilanes of the formula: $R_{4-n}SiX_n$ wherein R is lower alkyl or aryl, X is halogen and n is an integer of 1 to 3, etc. More specifically, there may be employed polysiloxanes (e.g. polydimethylsiloxane, polymethylethylsiloxane, polydiethylsiloxane, polymethylphenylsiloxane), silanes (e.g. tetraethylsilane, trimethylhexylsilane), halosilanes (e.g. triethylchlorosilane, diethyldichlorosilane, phenyltrichlorosilane, diphenyldichlorosilane), etc. These organo-silicon compounds are preferred to have a viscosity of $10^1$ to $10^5$ cSt (centistokes) for the convenience on the mixing of the graft polymer (A), the copolymer (B) and the organo-silicon compound (C).

As the lubricant (D), which is optionally incorporated into the resin composition of the invention, there may be used the one chosen from various lubricants as described on "Plastics", Vol. 19, No. 2 published in 1968 by Kogyo Chosakai. Specific examples are hydrocarbons, liquid paraffins, low molecular weight polyethylenes, higher fatty acids, fatty acid amides, alkylenebis (fatty acid amides), esters, metal soaps, fatty alcohols, polyalcohols, esters of fatty acids with lower alcohols, esters of fatty acids with polyalcohols, esters of fatty acids with fatty alcohols, etc. These lubricants may be used alone or in combination.

In the resin composition of the invention, the weight proportion of the graft polymer (A) and the copolymer (B) is from 5:95 to 95:5. When the content of the graft polymer (A) is lower than the lower limit, the heat cycle property of the resulting resin composition is poor and the adhesion strength between such resin composition and a metal film is inferior. In addition, physical properties including impact resistance are much deteriorated. On the other hand, when the content of the graft polymer (A) is higher than the upper limit, not only the heat cycle property but also the processability and the heat resistance are significantly lowered.

The organo-silicon compound (C) is used in an amount of 0.05 to 3.0 parts by weight to 100 parts by weight of the combined amount of the graft polymer (A) and the copolymer (B). When the amount is lower, its uniform dispersion is not assured so that the heat cycle property will be lowered. When the amount is higher, the operation for incorporation and mixing becomes more or less difficult, and the heat cycle property and the heat resistance are lowered.

The amount of the lubricant (D) may be, if used, from 0.05 to 3.0 parts by weight to 100 parts by weight of the combined amount of the graft polymer (A) and the copolymer (B). In case of using a smaller amount, the uniform dispersion of the lubricant (D) is not assured so that the mold release characteristics will be inferior. In case of using a larger amount, the "sliding" phenomenon due to the lubricant occurs on mixing, and therefore a sufficient mixing is hardly possible. In addition, the heat resistance of the resulting resin composition is lowered without any improvement in heat cycle property.

For preparation of the thermoplastic resin composition of the invention, the graft polymer (A), the copolymer (B) and the organo-silicon compound (C) are mixed together with or without the lubricant (D) by a conventional mixing procedure.

The thus obtained thermoplastic resin composition is then molded into a desired shape by a conventional molding procedure such as injection molding or extrusion molding.

The thus obtained molded product is then metal-plated according to a conventional plating procedure, of which a typical example is shown in the following chart:

Chart 1

| | |
|---|---|
| Defatting | with an aqueous solution of a surfactant at 55° C. for 3 minutes |
| ↓ Etching | with sulfuric acid-anhydrous chromic acid mixture at 65 to 70° C. for 15 minutes |
| ↓ Neutralization | with aqueous hydrochloric acid at room temperature for 3 minutes |
| ↓ Catalyst | with aqueous solution of palladium chloride and stannous chloride in hydrochloric acid at room temperature for 2 minutes |
| ↓ Accelerator | with aqueous sulfuric acid at 45° C. for 3 minutes |
| ↓ Electroless plating | with plating solution comprising nickel sulfate, sodium phosphite and sodium citrate |
| ↓ Electroplating | cupric sulfate bath → nickel sulfate bath → anhydrous chromic acid solution |

In the above typical plating procedure, a copper film and then a nickel film are formed on the surface of the molded product. In order to enhance the corrosion resistance, the cupric sulfate bath is often replaced by one nickel sulfate bath or two nickel sulfate bathes. In such case, double nickel plating or triple nickel plating is effected. Usually, the thus double nickel plated or triple nickel plated product is markedly inferior in heat cycle property. When, however, the resin composition of the invention is used as a substrate material, an excellent heat cycle property can be observed even on the double nickel plated or triple nickel plated product.

Practical and presently preferred embodiments of the present invention are illustratively shown in the following Examples wherein part(s) and % are by weight unless otherwise indicated.

The physical properties were examined in the following manner:

(1) Heat cycle property

A molded article after plating is allowed to stand at room temperature for 15 minutes and then left in a cooler at −40° C. for 1 hour. The molded article is taken out from the cooler, allowed to stand at room temperature for 15 minutes and then left in an oven at 80° C. for 1 hour. Then, the molded article is taken out from the oven and allowed to stand at room temperature for 15 minutes. Taking the above steps (i.e. room temperature/15 minutes→−40° C./1 hour→room temperature/15 minutes→+80° C./1 hour) as one cycle, the cycle is repeated. If any abnormality such as blistering or cracking is not observed the plated film on the molded article after each cycle, it is judged as passing the heat cycle test. The heat cycle property of a resin composition is indicated by the passed number/the tested number after certain cycles.

(2) Processability

The test is carried out at 210° C. under a pressure of 30 kg/cm² by the use of a Koka flow tester (manufactured by K. K. Shimadzu Seisakusho).

(3) Mold release characteristics

Molding is continuously carried out by the use of an injection molding machine Type TS-100 (Nissei Jushi Co., Ltd.) under the following conditions until a rejected article having hollow, bend and/or crack due to knock-out pin is produced, and the number of the shots which gave a complete article is recorded: injection mold, ¼"×½"×5" rectangular mold; resin temperature, 260° C.; mold temperature, 80° C.; injection time, 15 seconds; cooling time of mold, 0 second.

EXAMPLE 1

A graft polymer (A), a copolymer (B) and an organosilicon compound (C) were admixed in a proportion as shown in Table 1 by Banbury mixer at a temperature of 190° to 200° C. for 5 minutes to give a resin composition (Nos. 1 to 12). The resin composition was subjected to injection molding by the use of an injection molding machine (30 oz) to give 10 radiator grilles (500×200 mm).

According to the process as shown in Chart 1, the radiator grilles were plated with copper, nickel and chromium in order. The thicknesses of the copper layer, the nickel layer and the chromium layer were 20μ, 10μ and 0.2μ, respectively. The heat cycle property was measured, and the results are shown in Table 1.

The radiator grilles made of the resin composition No. 1 or 9 were double-plated with nickel, and the heat cycle property of the plated articles was measured. The results are shown in Table 2.

TABLE 2

| Resin composition No. Cycle (passed/tested) | 1 | 9 |
|---|---|---|
| 1st | 10/10 | 0/10 |
| 3rd | 10/10 | 0/10 |
| 5th | 10/10 | 0/10 |

EXAMPLE 2

A graft polymer (A), a copolymer (B) and an organosilicon compound (C) and a lubricant (D) were admixed in a proportion as shown in Table 3 by a Banbury mixer at a temperature of 190° to 200° C. for 5 minutes to give a resin composition (Nos. 13 to 25). The resin composition was subjected to injection molding, and the resultant radiator grilles were plated in the same manner as in Example 1. The heat cycle property as well as the processability and the mold release characteristic were examined on the plated articles so obtained. The results are shown in Table 3.

The radiator grilles made of the resin composition No. 13 or 21 were double-plated with nickel, and the heat cycle property of the plated articles was measured. The results are shown in Table 4.

TABLE 1

| Resin composition No. Composition | Present invention (parts) | | | | | | | | | Comparison (parts) | | |
|---|---|---|---|---|---|---|---|---|---|---|---|---|
| | 1 | 2 | 3 | 4 | 5 | 6 | 7 | 8 | 9 | 10 | 11 | 12 |
| (A) Graft polymer | | | | | | | | | | | | |
| Emulsion polymerization product | | | | | | | | | | | | |
| B/S/A = 40/40/20 by weight | 30 | 40 | 40 | 40 | 40 | — | — | 40 | 40 | 30 | 40 | 40 |
| Emulsion-suspension polymerization product | | | | | | | | | | | | |
| B/S/A = 40/40/20 by weight | — | — | — | — | — | 40 | 40 | — | — | — | — | — |
| (B) Copolymer | | | | | | | | | | | | |
| Emulsion polymerization product | | | | | | | | | | | | |
| S/A = 70/30 by weight; IV = 0.55 | 70 | 60 | 60 | 60 | 30 | 60 | 30 | — | — | 70 | 60 | 60 |
| α-S/S/A = 50/15/35 by weight; IV = 0.50 | — | — | — | — | 30 | — | — | — | — | — | — | — |
| S/A = 70/30 by weight; IV = 0.98 | — | — | — | — | — | — | — | 60 | — | — | — | — |
| Suspension polymerization product | | | | | | | | | | | | |
| S/A = 70/30 by weight; IV = 0.50 | — | — | — | — | — | — | 30 | — | — | — | — | — |
| S/A = 70/30 by weight; IV = 0.96 | — | — | — | — | — | — | — | — | 60 | — | — | — |
| (C) Organo-silicon compound | | | | | | | | | | | | |
| Polydimethylsiloxane (M.W. = 28,000) | 0.5 | 0.5 | 1.5 | — | — | 1.0 | 1.0 | 0.5 | 0.5 | — | 0.01 | 5 |
| Polymethylphenylsiloxane (M.W. = 18,000) | — | — | — | 0.5 | 1.0 | — | — | — | — | — | — | — |
| Heat cycle property (passed/tested) | | | | | | | | | | | | |
| 1st cycle | 10/10 | 10/10 | 10/10 | 10/10 | 10/10 | 10/10 | 10/10 | 10/10 | 10/10 | 3/10 | 5/10 | 7/10 |
| 3rd cycle | 10/10 | 10/10 | 10/10 | 10/10 | 10/10 | 10/10 | 10/10 | 9/10 | 9/10 | 0/10 | 3/10 | 4/10 |
| 5th cycle | 10/10 | 10/10 | 10/10 | 10/10 | 10/10 | 10/10 | 10/10 | 7/10 | 7/10 | 0/10 | 2/10 | 4/10 |

Note:
B, polybutadiene; S, styrene; A, acrylonitrile; α-S, α-methylstyrene. M.W., molecular weight.

$$IV \text{ (inherent viscosity)} = \frac{-1 + \sqrt{1 + \text{Huggins' constant} \times \text{specific viscosity}}}{2 \times \text{Huggins' constant} \times \text{concentration}}$$

(concentration, 0.4%; Huggins' constant, 0.375; viscosity tube, Cannon Fenske).

TABLE 3

| Resin composition No. Composition | Present invention (parts) | | | | | | | | Comparison (parts) | | | | |
|---|---|---|---|---|---|---|---|---|---|---|---|---|---|
| | 13 | 14 | 15 | 16 | 17 | 18 | 19 | 20 | 21 | 22 | 23 | 24 | 25 |
| (A) Graft polymer | | | | | | | | | | | | | |
| Emulsion polymerization product | | | | | | | | | | | | | |
| B/S/A = 40/40/20 by weight | 25 | 25 | — | — | 25 | 30 | 25 | — | 30 | 30 | 30 | — | — |
| Emulsion-suspension polymerization product | | | | | | | | | | | | | |
| B/S/A = 40/40/20 by weight | — | — | 25 | 25 | — | — | — | 25 | — | — | — | 25 | 25 |
| (B) Copolymer | | | | | | | | | | | | | |
| Emulsion polymerization | | | | | | | | | | | | | |

TABLE 3-continued

| Resin composition No. | Present invention (parts) | | | | | | | | Comparison (parts) | | | | |
|---|---|---|---|---|---|---|---|---|---|---|---|---|---|
| Composition | 13 | 14 | 15 | 16 | 17 | 18 | 19 | 20 | 21 | 22 | 23 | 24 | 25 |
| product | | | | | | | | | | | | | |
| S/A = 70/30 by weight; IV = 0.50 | 75 | 75 | — | 75 | — | 70 | — | — | 70 | 70 | 70 | — | — |
| S/A = 70/30 by weight; IV = 0.96 | — | — | — | — | — | — | 75 | — | — | — | — | — | — |
| Suspension polymerization product | | | | | | | | | | | | | |
| S/A = 70/30 by weight; IV = 0.53 | — | — | 75 | — | 75 | — | — | — | — | — | — | 75 | 75 |
| S/A = 70/30 by weight; IV = 0.98 | — | — | — | — | — | — | — | 75 | — | — | — | — | — |
| (C) Organo-silicon compound | | | | | | | | | | | | | |
| Polydimethylsiloxane (M.W. = 20,0000) | 0.5 | 0.5 | 1.0 | 0.3 | — | — | 0.5 | — | — | 0.01 | 10 | — | — |
| Polymethylphenylsiloxane (M.W. = 25,0000) | — | — | — | 0.2 | 0.5 | 1.0 | — | 0.5 | — | — | — | 0.5 | 0.5 |
| (D) Lubricant | | | | | | | | | | | | | |
| Fatty acid amide | 0.5 | 1.0 | — | 0.5 | 1.0 | 0.2 | 0.5 | — | — | 1.0 | 0.5 | 0.01 | 10 |
| Calcium stearate | — | — | 0.5 | — | — | 0.3 | — | 0.5 | — | — | — | — | — |
| Processability (ml/min) | 0.10 | 0.13 | 0.10 | 0.11 | 0.13 | 0.10 | 0.07 | 0.06 | 0.05 | 0.07 | 0.2 | 0.06 | 0.4 |
| Mold release characteristics (Number of shots) | >100 | >100 | >100 | >100 | >100 | >100 | >100 | >100 | 4 | 35 | >100 | 5 | >100 |
| Heat cycle property (passed/tested) | | | | | | | | | | | | | |
| 1st cycle | 10/10 | 10/10 | 10/10 | 10/10 | 10/10 | 10/10 | 10/10 | 10/10 | 0/10 | 4/10 | 7/10 | 10/10 | 6/10 |
| 3rd cycle | 10/10 | 10/10 | 10/10 | 10/10 | 10/10 | 10/10 | 9/10 | 9/10 | 0/10 | 2/10 | 6/10 | 10/10 | 4/10 |
| 5th cycle | 10/10 | 10/10 | 10/10 | 10/10 | 10/10 | 10/10 | 7/10 | 7/10 | 0/10 | 2/10 | 6/10 | 10/10 | 4/10 |

TABLE 4

| Resin composition No. Cycle (passed/tested) | 13 | 21 |
|---|---|---|
| 1st | 10/10 | 0/10 |
| 3rd | 10/10 | 0/10 |
| 5th | 10/10 | 0/10 |

What is claimed is:

1. A thermoplastic resin composition which comprises (A) a graft polymer comprising a conjugated diene rubber and an aromatic vinyl compound and a vinylic cyanide grafted thereon in a weight proportion of 5–80:15–140, the weight ratio of the aromatic vinyl compound and the vinylic cyanide being 10–90:5–50, (B) a copolymer comprising an aromatic vinyl compound and a vinylic cyanide in a weight ratio of 40:60 to 90:10 and (C) an organosilicon compound, the weight proportion of the graft polymer (A) and the copolymer (B) being from 5:95 to 95:5 and the amount of the organo-silicon compound (C) being from 0.05 to 3.0 parts by weight to 100 parts by weight of the combined amount of the graft polymer (A) and the copolymer (B).

2. The resin composition according to claim 1, which further comprises (D) a lubricant in an amount of 0.05 to 3.0 parts by weight to 100 parts by weight of the combined amount of the graft polymer (A) and the copolymer (B).

3. The resin composition according to claim 1, wherein the conjugated diene rubber is used in an amount of 5 to 60% by weight based on the total amount of the resin composition.

4. The resin composition according to claim 1, wherein the inherent viscosity of the copolymer (B) is from 0.4 to 0.8.

5. The resin composition according to claim 2, wherein the lubricant is at least one selected from the group consisting of hydrocarbons, fatty acids, fatty acid amides, esters of fatty acids, metal soaps, fatty alcohols and, polyalcohols.

6. A molded article made of the thermoplastic resin composition accoding to claim 1.

* * * * *